May 31, 1966 R. A. MILLER ETAL 3,254,162

MAGNETIC STORAGE REPERTORY DIALER

Filed June 14, 1962 5 Sheets-Sheet 1

INVENTORS R. A. MILLER
C. M. TARIS
BY E J Olinder
ATTORNEY

MAGNETIC STORAGE REPERTORY DIALER

Filed June 14, 1962 5 Sheets-Sheet 2

INVENTORS R. A. MILLER
C. M. TARIS
BY E J Oluider
ATTORNEY

INVENTORS R. A. MILLER
C. M. TARIS
BY [signature]
ATTORNEY

INVENTORS R. A. MILLER
C. M. TARIS
BY E. J. Oluder
ATTORNEY

INVENTORS R. A. MILLER
C. M. TARIS
BY E J Oluider
ATTORNEY

United States Patent Office 3,254,162
Patented May 31, 1966

3,254,162
MAGNETIC STORAGE REPERTORY DIALER
Robert A. Miller, Plainfield, and Charles M. Taris, Cranford, N.J., assignors to Bell Telephone Laboratories, Incorporated, New York, N.Y., a corporation of New York
Filed June 14, 1962, Ser. No. 202,563
12 Claims. (Cl. 179—90)

This invention relates to telephone calling devices and more particularly to repertory dialers. The general object of the invention is to improve telephone substation apparatus of the repertory dialer type which employs magnetic drum storage.

In the art of telephone substation apparatus substantial advances have been made toward the goal of reducing the effort and time required of a telephone subscriber in establishing a connection between his own set and a distant called set. It has long been recognized that a basic step toward that goal is to eliminate the requirement for a customer repeatedly to manipulate pushbuttons or a telephone dial fingerwheel. The elimination of manual dialing has a two-fold purpose in that it renders the service basically more attractive by reducing the various physical manipulations which a subscriber is called upon to perform and further it, in effect, increases the call-handling capacity of central office switching equipment by reducing the time required for the generation of dial pulses. Approaches to the aforementioned goal have included the employment of mechanical means to perform the dial manipulations normally performed by the subscriber. Another approach has been the provision of various repertory storage arrangements whereby the subscriber is enabled to store a group of directory numbers and to translate such numbers into dial pulses at will by the actuation of a single button or the like.

One specific type of repertory dialer employs a magnetic drum storage arrangement which is maintained at the subscriber's premises. Normal manual operation of the dial fingerwheel is employed to generate pulses which are then applied to a selected track on the magnetic drum for storage. Typically, such arrangements provide for the storage of approximately fifty or more directory numbers, these, advantageously, being the numbers called most frequently by the subscriber. Automatic dialing out of a stored number is accomplished by setting a manually operated indicator on a display panel to the desired number. Manual actuation of a CALL button initiates the CALL mode of operation which involves a reading out of the stored digits, amplification and application of reconstituted pulses to the telephone line. An illustrative magnetic repertory dialer station set of this general type is shown, for example, in U.S. Patent 2,941,043, issued to J. H. Ham et al., June 14, 1960.

Despite the relative sophistication of repertory dialers of the type shown by Ham et al., when compared to earlier models in the prior art, a number of problems relating to operational reliability and convenience remain to be solved. For example, in the magnetic drum repertory dialers of the prior art, rotation of the storage drum during the RECORD cycle is initiated by the operation of dial OFF–NORMAL contacts. As a result, any delay by the customer in the release of the dial fingerwheel is necessarily translated into a blank space on the drum. Accordingly, the time required for a subsequent automatic dialing of the number recorded is necessarily extended and the accompanying increase in the utilization time of central office switching equipment in effect tends to diminish one of the advantages that a repertory dialer is designed to achieve.

Additionally, in accordance with the prior art, it is conventional practice to employ the same set of pulse generating dial contacts for direct conventional dialing and for operation in the RECORD mode. As a result, in the simultaneous CALL and RECORD mode of operation, or when a number is to be dialed directly without recording, pulses are applied to the line by way of a multiplicity of conducting paths and elements in the recording circuit. Any malfunctioning of this circuit thus renders the set completely inoperative. Consequently, the reliability of such a set as compared to a conventional nonrepertory subscriber's set is necessarily reduced.

Further, known repertory dialers fail to provide convenient and fully reliable means for recording and transmitting the type of call commonly known as a dual-dial-tone call. As is known in the art, this type of call requires the reception of an initial dial tone from a local office, the dialing of one or more so-called "access" numbers, the receipt of a second dial tone from an intermediate switching point such as a more distant central office and finally, the dialing of the remaining digits of the called subscriber's number. In the RECORD mode of operation conventional practice calls for the automatic generation of an extended length interdigital space in anticipation of the receipt of a second dial tone. In the event that the second dial tone is for some reason delayed for a period longer than anticipated by the fixed recorded space, automatic dialing proceeds without benefit of the required dial tone which results in an uncompleted call and the subscriber is required to repeat the entire operation.

Accordingly, a specific object of the invention is to attain maximum utilization of the recording space provided by the storage medium of a repertory dialer.

A further object of the invention is to increase the versatility of the functions performed by a repertory dialer of the magnetic drum storage type.

An additional object of the invention is to increase the operating convenience of a repertory dialer without sacrificing operating reliability.

These and other objects are achieved in accordance with the principles of the invention by a repertory dialer of the magnetic drum storage type which employs two separate and distinct pairs of dialing or pulse generating contacts. One set of contacts performs the conventional function of generating pulses for direct application to the line when normal rather than repertory dialing is performed. A second set of so-called "anticipator" dialing contacts is provided for the generation of pulses to be recorded on the drum. The term "anticipator" is employed to denote the anticipation of pulses to be recorded. In accordance with the invention, operation of these contacts does not occur until actual release of the fingerwheel by the subscriber at the conclusion of the windup cycle. During run-down a preliminary or "anticipator" pulse is generated prior to the generation of any digit pulse and it is this anticipator pulse which is employed to initiate the recording process.

More specifically, in accordance with the invention, the generation of an anticipator pulse, as described, is employed to activate a fast-acting clutch mechanism which starts the rotation of the drum. The elapsed time between the generation of the anticipator pulse and the first digit pulse is uniquely selected to enable the drum to attain full rotational speed before the recording of the first digit pulse takes place. In effect, selection of the precise moment at which recording commences is preset and the subscriber is precluded from wasting recording space by slow rotation of the fingerwheel or by undue delay at the top of the windup cycle before release.

An arrangement in accordance with the invention for recording and calling a dual-dial-tone type of directory number includes a manually operated DIAL TONE button which is designed for operation before and after dialing the access digit or digits of a dual-dial-tone number. The DIAL TONE button is arranged uniquely to control the interdigital spacing so that in the CALL cycle when a dual-dial-tone number is being automatically pulsed out, the drum is automatically stopped after the transmission of the access digit or digits and transmission is not permitted to continue until the subscriber depresses the CALL button once again. Hence, undue delay in the receipt of the second dial tone is readily accommodated.

Accordingly, one feature of the invention relates to the employment in a repertory dialer of the magnetic drum type of a first set of dial contacts for conventional direct outpulsing to the line and a second set of dial contacts for the generation of pulses to be recorded.

A further feature resides in an arrangement which provides for the generation of a so-called "anticipator" pulse by the second set of dial pulse contacts upon the release of the dial fingerwheel at the termination of the windup cycle, which pulse is employed to initiate the rotation of the recording drum.

A further feature of the invention pertains to a means for automatically stopping the rotation of the recording drum for an indefinite period after the transmission of the access digits of a dual-dial-tone type of call during the CALL function.

A further feature resides in an arrangement wherein the magnetic drum automatically resets to the start position after pulsing out the last digit of either a single or a dual-dial-tone type of directory number.

These and other objects and features of the invention will be fully apprehended by reference to the following detailed description of an illustrative embodiment and to the appended drawing in which.

Figures 4, 5, 8:
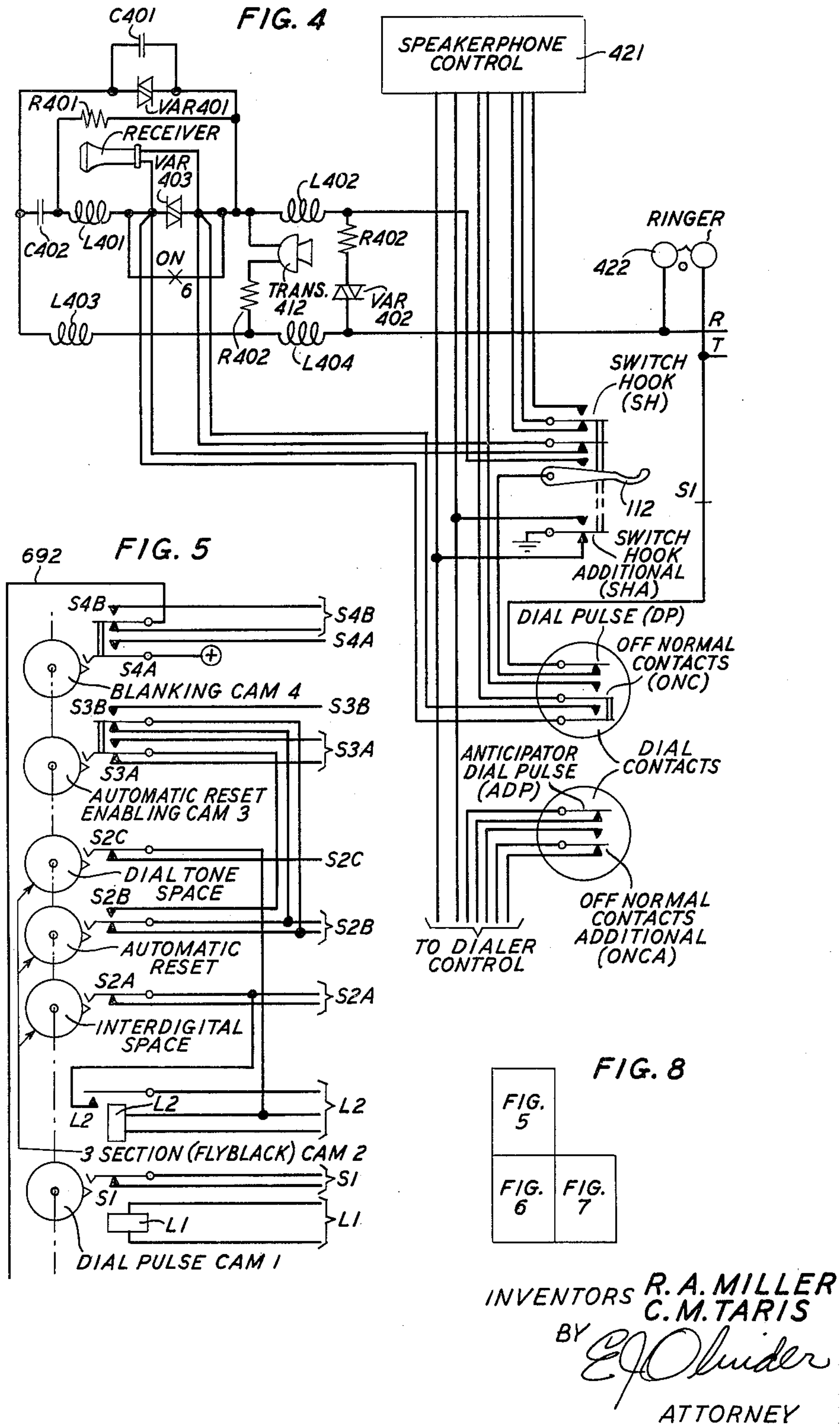
FIG. 4 is a schematic circuit diagram of the telephone voice circuit and its interconnection with the switchhook and dial contacts.
FIG. 5 is a schematic mechanical diagram of the cam array and of the switches operated thereby.
Figure 6:
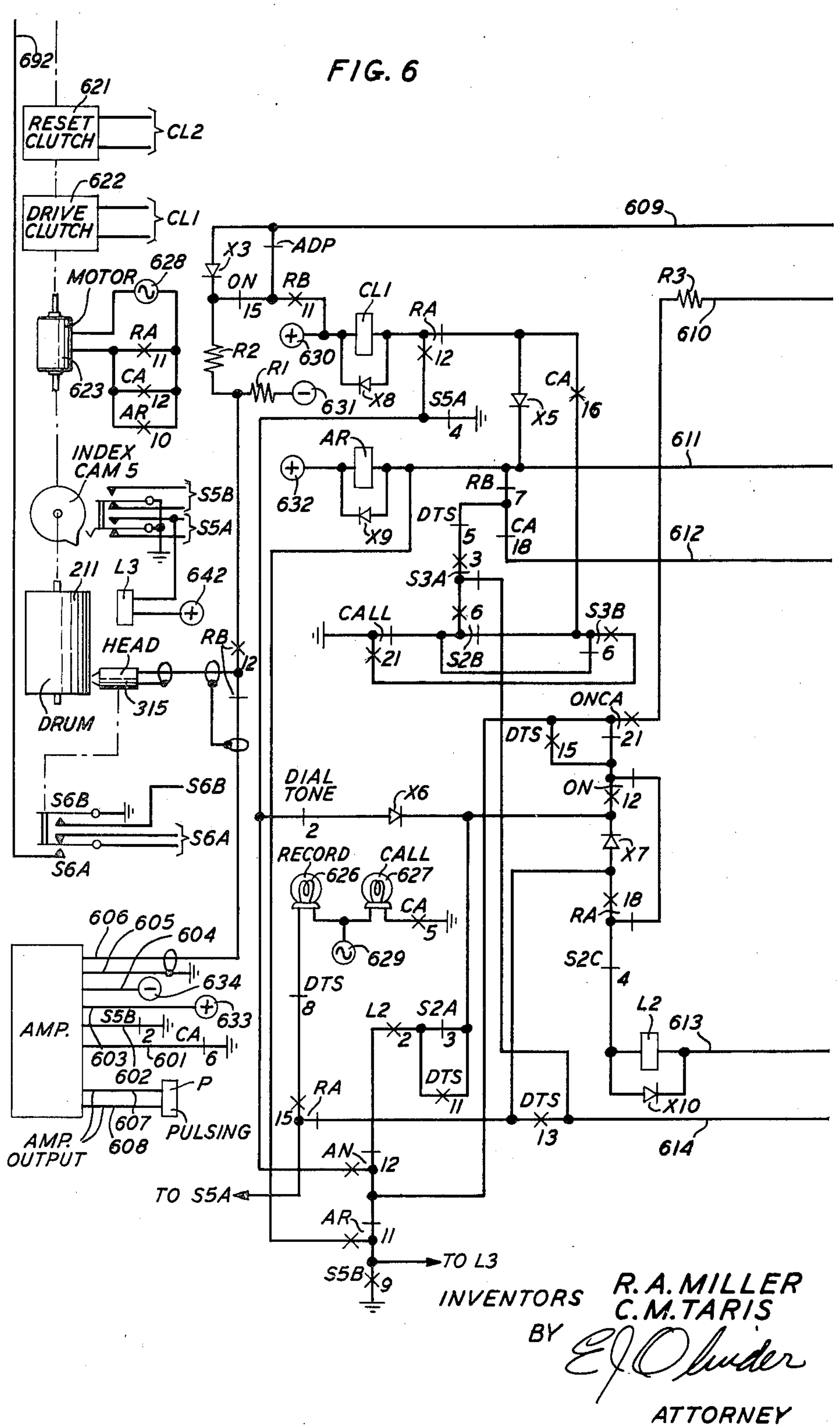
Figure 7:
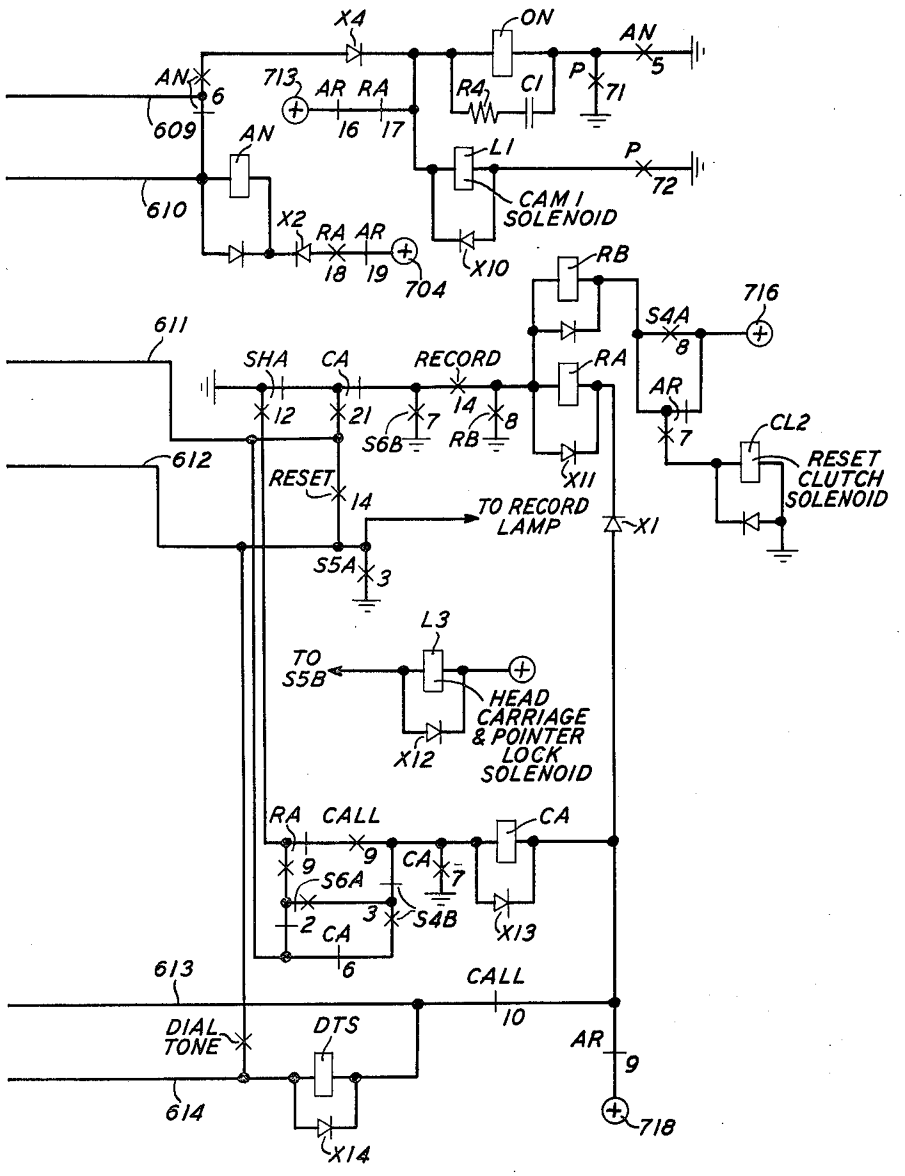

FIGS. 6 and 7 present a schematic circuit diagram of the repertory dialer control circuit; and FIG. 8 is a block diagram showing the over-all interrelation among FIGS. 5, 6 and 7.

Figure 1:
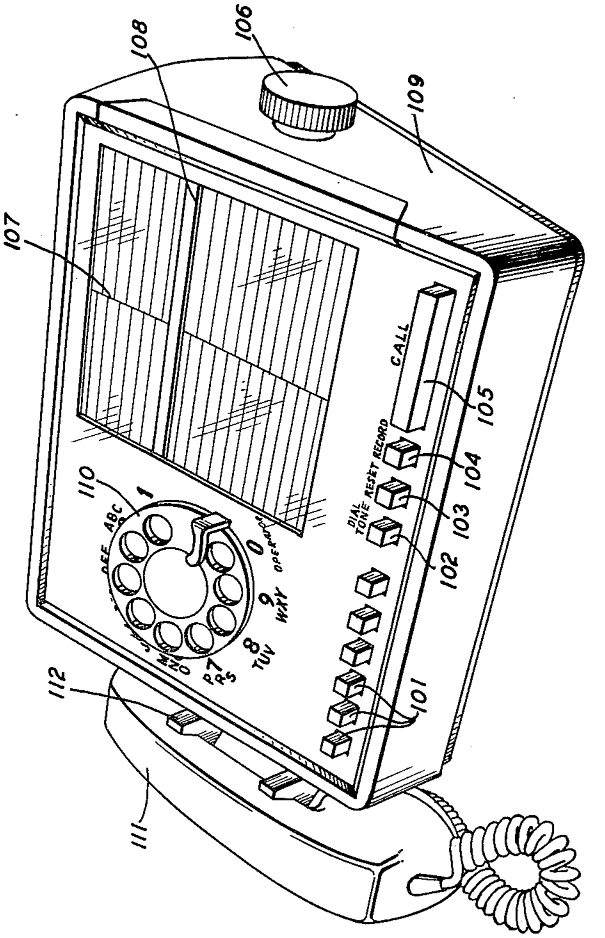
FIG. 1 is a front perspective view of a repertory dialer in accordance with the invention.

The various mechanical structures and electrical circuitry embodying the features of the invention may typically be housed as an integral unit as shown in FIG. 1. The unit is enclosed by an outside casing member 109 and mounts a conventional switchhook 112 carrying a handset 111. Suitable apertures are provided to accommodate a dial fingerwheel 110 and various operating buttons. The six buttons 101 are those normally associated with a six-button key telephone set. Operating buttons controlling the functions of the repertory dialer include a DIAL TONE button 102, a RESET button 103, a RECORD button 104, and a CALL button 105. The particular function of each of these buttons is discussed in connection with the detailed description of operation which is set forth below herein.

Figure 2:
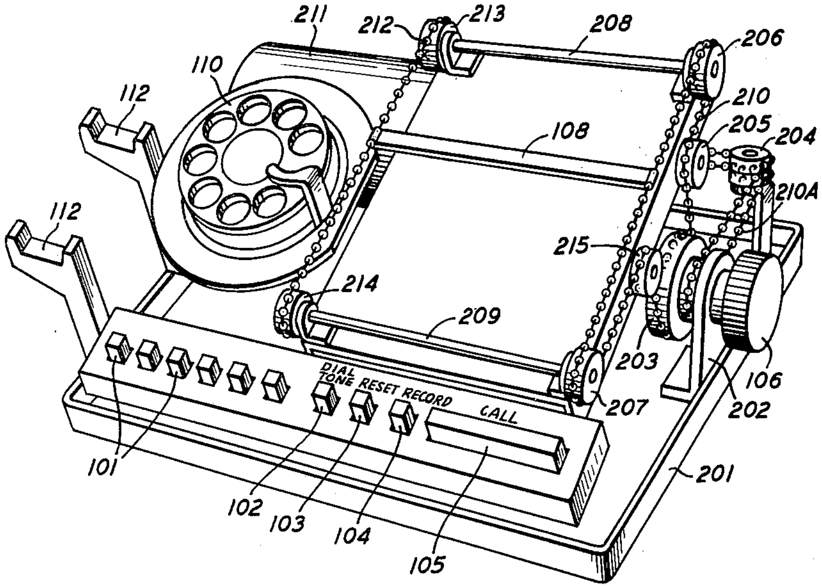
FIG. 2 is the same view as FIG. 1 with the face plate and cover member removed.

A removable, two-column name and directory number display card 107 is provided to enable a subscriber to record up to fifty names and associated directory numbers. A number to be called is selected by positioning an indicator bar 108 by means of a selector control knob 106. The operation of these elements may be seen more readily in FIG. 2. In FIG. 2 it is evident that the selector control knob 106 may be rotated to drive an endless chain member 210 which is supported on sprockets 205, 206, 207, and 215. The connecting rod members 208 and 209 operate to drive two additional sprocket members 213 and 214. As shown, one end of the indicator bar 108 is affixed to the chain 210 and is consequently driven thereby.

Figure 3:
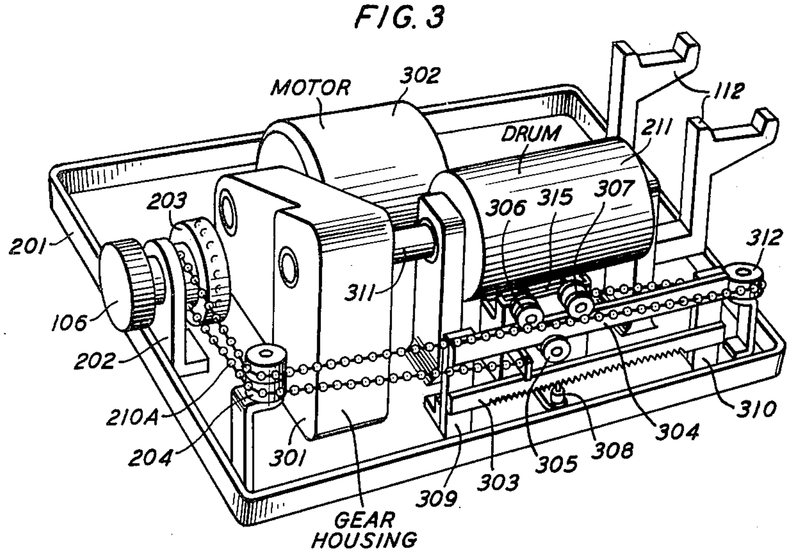
FIG. 3 is a rear perspective view of the repertory dialer of FIGS. 1 and 2 with the face plate cover and dial mechanism removed.

Further details of the over-all mechanical structure are shown in FIG. 3. A magnetic drum member 211 is suitably positioned to be driven by a motor 302 through gearing which is enclosed in housing member 301. A drive shaft 311 extends from the gear housing 301 to the magnetic drum 211. A combination recording-reproduce head member 315 is shown mounted on roller members 306 and 307 which in turn ride on a supporting bar 304. The supporting bar 304 is mounted on bracket members 309 and 310. The chain-driven recording head positioning member 308 is arranged to engage the toothed bar 303 which has a plurality of notches or teeth each corresponding to a respective circumferential recording track on magnetic drum 211.

Additional details of the various functions and features of a repertory dialer in accordance with the invention are discussed below in conection with a step-by-step explanation of each mode of operation with particular reference to the control apparatus and circuitry shown in FIGS. 4, 5, 6, and 7.

As a preface to a detailed discussion of the operational sequences involved in the various operational modes of an embodiment of the invention, a few general remarks are in order concerning the circuitry and mechanical elements as shown in FIGS. 4, 5, 6 and 7. FIG. 4 includes a conventional telephone voice circuit which includes a hybrid coil indicated by inductors L401 through L404, resistors R401 and R402, capacitors C401 and C402, varistors VAR401 through VAR403, a transmitter unit 412 and a receiver unit 411. The operation of such circuitry is well known to persons skilled in the art and it is included herein primarily to ensure the completeness of the disclosure. A Speakerphone control box 421 is included merely to indicate that a dialer in accordance with the invention is compatible with a Speakerphone arrangement.

In FIG. 5 various function cams 1 through 4 are shown each operatively associated with a respective switch or combination of switches. To promote clarity of presentation, conventional detached contact notation has been employed in the circuitry shown in FIGS. 6 and 7 with an "X" indicating a make contact and a "—" indicating a break contact. Correspondence between the detached contacts of FIGS. 6 and 7 and the conventional contacts shown in FIG. 5 together with additional conventional contacts shown in a part of FIG. 6 is clearly indicated by the use of corresponding identifying characters.

The contacts shown in FIGS. 6 and 7 are basically of three different types. One type is operated directly by one of the sequence control buttons shown in FIG. 1. Such contacts are designated numerically and also are labeled with the function corresponding to the associated operating button. Thus, for example, a make contact shown in FIG. 7 which is actuated by the RECORD button 104 of FIG. 1 is designated RECORD 14. The second type of contact is a conventional relay contact. With reference again to FIG. 6, a make contact operated by relay RB, for example, is designated RB8. The third type of contact is one operated by one of the control cams such as index cam 5 shown in FIG. 6. The detached contact counterpart of switch S5B is make contact 9 of switch S5B which is so designated as shown at the bottom of FIG. 6.

*Record mode*

Operations involved in the RECORD mode are presented first inasmuch as recording is typically the first function undertaken by a subscriber. Assuming that selector knob 106, shown in FIG. 1, has been operated to position the recording head 315 at a selected recording track, the RECORD function is initiated by depressing RECORD button 104. At this point all relays are unoperated, the dial is ON NORMAL, and receiver 111 is ON HOOK. Ground is extended to relays RA and RB, FIG. 7, over a path which includes the break contact of additional switchhook contact SHA12, also shown in FIG. 4, break contact 21 of relay C and the RECORD button make contact 14.

By the operation of relay RA and the consequent closure of make contact RA11, FIG. 6, a path to an A.-C. power source 628 is completed for the operation of drive motor 623. Additionally, an operating path for solenoid CL1, FIG. 6, which operates drive clutch 622, is completed by the operation of make contact RA12. The operating path extends from ground through break contact S5A4 through make contact RA12, through the windings of solenoid CL1 and thence to power source 630. Positive potential is extended to the recording head from power supply 630 by way of make contact RB11, the anticipator dial pulse break contact ADP, diode X3, resistor R2, and make contact RB12. At this time, the anticipator dial pulse contact ADP and diode X3 are shunted by break contact ON15. A positive potential is also extended to one side of relay AN, FIG. 7, from source 704 by way of break contact AR19, make contact 18 of operated relay RB and diode X2.

The operation of drive clutch 622 as described above starts the rotation of the magnetic drum 211 which in turn drives index cam 5, FIG. 6, until drum index switches S5A and S5B operate. Ground is removed from solenoid CL1 by the operation of break contact S5A4, drive clutch 622 disengages recording drum 211 from drive motor 623 and consequently the drum 211 stops its rotation. The closure of make contact RA15 and the operation of index switch S5A3 completes a path to light the RECORD lamp 626, which is located physically underneath the designation RECORD appearing above button 104. The operation of index switch S5B9 completes an obvious path for the operation of solenoid L3 which serves to clamp the RECORD-REPRODUCE head carriage 315 and restrains rotation of selector control knob 106 by engaging RECORD-REPRODUCE head positioning member 308 into toothed bar 303. The action of solenoid L3 serves two functions: (1) positions RECORD-REPRODUCE head carriage 315 properly over the assigned track on the drum 211 in the event exact alignment of indicator bar 108 and RECORD-REPRODUCE head carriage 315 is lacking; (2) prevents erasure of previously recorded tracks by restraining rotation of selector knob 106 during the RECORD function.

If, at this point, the subscriber should change his mind and not wish to record, the drum can be restored to the index or start position by lifting handset 111 momentarily or by depressing RESET button 103. The RESET clutch 621, through suitable high-speed gearing, not shown, drives recording drum 211 forward at high speed, resetting the drum to an index position in a relatively brief period. Erasure does not take place during this RESET operation and accordingly any number previously recorded is not disturbed.

Assuming, however, that RESET action is not initiated, the control circuitry and apparatus, as described above, is in all respects aligned for the recording operation. To record, the subscriber winds up dial 110 for the first digit. OFF-NORMAL contacts ONC and additional OFF-NORMAL contacts ONCA, shown in FIG. 4, operate. At this point relay AN of FIG. 7 is shunted down over a path which includes its own break contact 6, lead 609, break contact ADP of the additional dial pulse contacts shown in FIG. 4, make contact RB11 and power source 630. Upon the release of dial 110 after windup and after a brief period of run-down which may be approximately 20 milliseconds, for example, anticipator dial pulse contacts ADP, FIG. 6, open, the shunt on relay AN is removed and relay AN operates. Relay AN is termed an "anticipator" relay in that its operation anticipates the generation of dial pulses. With the operation of relay AN an obvious operating path is closed to energize solenoid CL1 which causes DRIVE clutch 622 to engage, thus rotating drum 211. At this point erasure of the drum takes place since direct current sufficient to saturate the magnetic medium is caused to flow through the RECORD-REPRODUCE head 315 by way of the shunt path around open anticipator dial pulse contacts provided by break contact ON15 as previously described.

Rotation of the drum 211 also causes switches S4A and S4B to operate. These are conditioning switches associated with the RESET function. The operation of switch S4A, FIG. 7, bypasses the RESET-without-erasure feature noted above and erasure is enabled until drum indexing occurs.

Anticipator-dial pulse break contacts ADP, FIG. 6, remain open for a period of about 60 milliseconds. As the contacts close, positive potential is applied to one side of relay ON and capacitor C1 from the source 630 by way of make contacts RB11, lead 609, make contacts AN6 and diode X4. Ground has previously been applied to the opposite side of relay ON by way of make contact AN5, relay ON operates and capacitor C1 charges. With the previous shunting path opened by break contact 15 of relay ON, FIG. 6, anticipator dial contacts ADP are provided with a nonshunted path to pulse current through the RECORD head 315. As the dial runs down, the anticipator dial pulse break contacts ADP open and close. This action changes current in the head from a positive (saturation) value to a negative (saturation) value and back to positive. The current reversals correspond to the pulses of the digit, one plus-to-minus-to-plus change for digit "one," two such changes for digit "two" and a corresponding number of such changes for succeeding digits. Positive potential to relay ON is removed periodically for about 60 milliseconds as the anticipator dial pulse contacts open and close but relay ON does not release because the charge on capacitor C1 provides holding current.

After the last opening of anticipator dial pulse contacts ADP for the dialed digit, the release of the additional OFF-NORMAL contacts ONCA restores the circuit to its nonoperated condition. Specifically, the operating path for relay AN which includes lead 610 and resistor R3 is opened to make contact 21 of the additional OFF-NORMAL contacts ONCA, FIG. 6. Operating solenoid CL1 of drive clutch 622 now holds operated over a path to ground by way of make contact RA12, break contact 2 of DIAL TONE button 102, diode X6, make contact 12 of relay ON, break contact 21 of the additional OFF-NORMAL contacts ONCA, break contact AR11 and make contact S5B9. Additionally, release of the additional OFF-NORMAL contacts ONCA allows solenoid L2 to operate over a path which includes break contact S2C4, the operated contacts of relay RA, diode X7, the operated contacts of relay ON, break contact 21 of OFF-NORMAL contacts ONCA, break contact AR11, make contact S5B9, and thence to ground. Solenoid L2 locks up to ground over a path which includes the closed contacts of switch S2C, the operated contacts of relay RA, diode X7, the closed contacts of switch S2A, the operated contacts of solenoid L2, the closed contacts of relays AN and AR and the operated contacts of switch S5B. The release of relay AN also opens the operate path of relay ON by removing ground from relay ON at make contact 5 of relay AN and relay ON releases in about 100 milliseconds as capacitor C1 discharges. The lockup path of solenoid L1 now transfers to the lockup path of solenoid L2 which may be traced from the operated contacts of relay RA, closed contacts of DIAL TONE button 102, diode X6, closed contacts of switch S2A, operated contacts of solenoid L2, closed contacts of relays AN and AR, make contacts S5B9 and thence to ground.

As indicated schematically in FIG. 5 by the position of solenoid L2 with respect to the three-section flyback cam 2, the rotation of the flyback cam 2 is initiated by the operation of solenoid L2. The rotation of cam 2 tensions a spring (not shown). Cam 2 rotates for approximately 0.5 second. This interval, during which the drum turns, constitutes the major portion of interdigital space. At the end of the interval, switch S2A is opened by the interdigital space cam. Solenoid L2 is released when its operating path is opened by break contact S2A3, FIG. 6. Release of solenoid L2 removes the restraint on cam 2 allowing the tensioned spring to fly cam 2 back to the start position. Switch S2A contacts close.

Break contact S2A3 also opens the operating path of solenoid CL1, causing its associated drive clutch 622 to release and drum 211 stops.

The first digit of the directory number is now recorded and the fixed interdigital space is generated automatically. The recording drum 211 is stationary at this point and will remain so until dial 110 starts to run down after the dialing of a succeeding digit.

For the recording of a dual-dial-tone type of call a waiting interval is required after one or more access digits have been dialed to ensure reception of the second dial tone. Before dialing the access digits or digit, the subscriber momentarily depresses the DIAL TONE button 102 which is arranged to operate relays DTS, FIG. 7, directly. The operation of relay DTS completes a path for the operation of solenoid L2 through make contact 13 of relay DTS. Both relay DTS and solenoid L2 now lockup on operated contacts of solenoid L2 through the path described above. Additionally, an operate path is provided for a solenoid CL1 of drive clutch 622 by way of operated contacts of solenoid L2 and drum 211 rotates. Solenoid L2 operated starts the rotation of flyback cam 2 and after approximately 0.8 second of cam rotation, cam switch S2C which is operated by the uppermost one of the three sections of the flyback cam 2 opens cam switch S2C. Cam switch S2C operated releases solenoid L2 by opening the operating path at break contact S2C4, which is shown in FIG. 6 immediately adjacent to solenoid L2. Relay DTS and solenoid CL1, employing the operate path which includes make contacts of solenoid L2, also release. With the operating path of solenoid CL1 opened, drum 211 stops.

RECORD lamp 626 is extinguished by the opening of break contact DTS8 during the 0.8 second interval to aid the subscriber in recording this type of number properly.

At this point the track on drum 211 has an erased or blank space equivalent to approximately 0.8 of a second of recording. After the subscriber dials the access digit or digits he once again depresses DIAL TONE button 102 momentarily and the sequence of operations described immediately above is repeated with the result that a second blank space of about 0.8 second in duration is placed on drum 211. The remainder of the regular directory number may then be dialed.

*Manual reset mode*

After the last digit has been recorded, an action on the part of the subscriber is required to restore the drum to its index or start position. The subscriber may depress RESET button 103 or, alternatively, lift handset 111 momentarily. Either action initiates the RESET function and the drum is rapidly restored to its start position by being driven forward at high speed. During the fast forward motion of the drum, erasure is active. Pulses of a previously recorded number, if present, are erased so that they do not interfere with subsequent pulsing out operations which are involved in the CALL function.

Specifically, operations involved in the RESET mode are as follows. Ground is extended to relay AR through make contact 12 of the additional switchhook contacts SHA or through make contact 14 of the RESET button 103. With the operation of relay AR a positive potential is extended to the RESET clutch solenoid CL2 from the source 716 by way of make contact S4A and make contact 7 of relay AR. Relay RA releases and, if operated, relay ON and solenoid L2 all release when their respective operating paths are opened by the associated break contacts of relay AR. Relay RA released operates drive clutch 622 by extending ground to the drive clutch operating solenoid CL1 by way of break contact 12 of relay RA. With the shift in gearing effected by the operation of RESET clutch solenoid CL2 (not shown in detail), the drum 211 is caused to rotate at a speed of about twenty times that employed during the RECORD mode. At this point the RECORD lamp 626 is extinguished since its operating path is opened at make contact 15 of relay RA when relay RA releases.

As drum 211 approaches the end of one revolution, blanking cam 4, FIG. 5, causes switch S4A to open and RESET clutch solenoid CL2 releases since its operating path is opened at make contact S4A8. Accordingly, drum 211 resumes normal recording speed under control of drive clutch 622 and its operating solenoid CL1. Power source 716 is also removed from relay RB by the opening of make contact S4A and relay RB releases. With relay RB released drum erasure stops in that the path supplying direct current to RECORD head 315 is opened by the opening of make contact 12 of relay RB.

Within a brief period of approximately 0.5 second, for example, drum 211 assumes a position at which index switches S5A and S5B open. Relay AR releases when its grounded side is opened by the opening of make contact S5A3. Clutch solenoid CL1 also releases when ground is removed from its operating side by the opening of make contact AR12 and drum 211 stops. Solenoid L3 also releases by virtue of the removal of ground by contact S5B9. Accordingly, the clamp on head carriage 315 and the corresponding restraint on selector control knob 106, FIG. 3, are removed. With relay AR released the operating path for motor 623 is opened at make contact 10 of relay AR and the motor is de-energized. At this point drum 211 is stopped, all relays and solenoids are released which marks the end of the RESET cycle.

*Call mode*

To initiate the CALL mode of operation a subscriber first selects one of the fifty numbers stored on the drum by means of the SELECTOR knob 106, FIG. 1. Handset 111 is lifted off the cradle 112 and switchhook contacts SH and SHA, shown in FIG. 4, operate to preset the CALL function. As soon as the central office dial tone is heard in the handset receiver 111, the subscriber depresses the CALL button 105. The CALL button 105 is arranged to operate the CALL make contact 9, shown in FIG. 7, which completes an operating path for the CALL relay CA, which path extends from ground through additional switchhook make contact SHA12, break contact 9 of relay RA, make contact 9 of the CALL button, the winding of the CALL relay and thence to direct-current supply 718 by way of break contact AR9. Motor 623 is energized over a path which includes make contact 12 of the CALL relay, FIG. 6. An operating path for the CALL lamp 627 is completed by the operation of make contact 5 of relay CA. With the CALL button 105 released, drive clutch solenoid CL1 is operated over a path which includes break contact 12 of relay RA, make contact 16 of relay CA, break contact S3B6, break contact 21 of the CALL button and thence to ground. At this point drum 211 rotates.

Approximately one-half second after drum 211 starts to rotate together with index cam 5, switches S5A and S5B operate. Ground is removed from the amplifier by the operation of break contact S5B. Details of the amplifier circuitry are not shown inasmuch as any conventional pulse amplifier may be employed. Additionally, the operation of switch S5A extends ground to solenoid L3 and solenoid L3 operates which serves to clamp the RECORD-REPRODUCE head 315 and the name display indicator bar 108. As the drum turns, dial pulses recorded thereon are picked up by the RECORD-REPRODUCE head 315 and applied to the amplifier by way of lead 606. Amplified pulses are applied to operate the pulsing or P-relay by way of leads 607 and 608. Make contact 72 (FIG. 7) of the P-relay extends ground to the cam 1 operating solenoid L1 and solenoid L1 operates. Relay ON also operates since a path to ground is completed at make contact 71 of the P-relay.

As indicated schematically in FIG. 5, the operation of solenoid L1 releases restraint on a spring clutch (not shown) associated with the dial pulse cam 1 and cam 1 rotates. Cam switch S1 in FIG. 4 opens for approximately 60 milliseconds. Switch S1 opens the telephone line for this interval which corresponds to a dial pulse. Relay ON operated mutes the receiver of the handset 111 by providing a shorting path through make contact 6 of relay ON, shown in FIG. 4.

Relay P is arranged to be held operated for a period of about 50 milliseconds. As it releases, solenoid L1 also releases. With solenoid L1 released cam 1 stops after one complete revolution (about 80 milliseconds in duration). The opening and closing of switch S1 by cam 1 in effect reconstitutes the dial pulses recorded on the drum. The contour of cam 1, the spring adjustment of switch S1 and the speed of motor 623 determine the open-close ratio of the pulses while the speed of drum 211 alone in the RECORD and CALL functions determines the pulse rate.

The release of relay P does not immediately release relay ON since relay ON has slow release characteristics. The release time of relay ON is sufficiently long to bridge the interval between successive pulses during which relay P is released. As a result, relay ON mutes the receiver of handset 111 for the entire duration of the digit. After the last pulse of the recorded digit is reproduced, relay ON is permitted to release by the opening of make contact 71 of relay P. Relay ON remains released during the interdigital interval.

*Automatic reset mode*

Drum 211 runs continuously at a speed of approximately one-quarter inch per second during the CALL function. After about 1.3 seconds of rotation the automatic reset enabling cam 3 operates switches S3A and S3B. As explained in additional detail below, the operation of switch S3A enables switch S2B of the three-section flyback cam 2. The function of cam 2 at this point is to sense the end of the recorded number and thereupon to initiate drum RESET automatically. The operational sequence for the automatic RESET feature is as follows:

As pointed out above, after the last pulse of a recorded digit is reproduced, relay ON slow releases. Relay ON released extends ground to the operating solenoid L2 of cam 2 over a path which includes make contact S5B9, make contact 11 of relay AR, break contact 21 of the additional OFF-NORMAL contacts ONCA, break contact 12 of relay ON, break contact 18 of relay RA and break contact S2C4. With its driving solenoid L2 operated, cam 2 turns. If there are still other digits recorded, relay P operates after the interdigital interval of about 0.6 second. With relay P operated, relay ON operates as described above. The operation of relay ON opens the operating path for solenoid L2 at break contact 12 of relay ON and solenoid L2 releases. Cam 2, operating against the tension of a flyback spring (in a conventional flyback spring arrangement, not shown), flys back to the start position. Thus, cam 2 starts rotation during the interdigital time but is released as the first pulse of the next digit comes along.

After the last recorded digit is reproduced, drum 211 is free of modulation because of erasure which occurs in the RECORD and RESET functions. Cam 2 is therefore allowed to continue turning (for about 0.7 second) until switch S2B operates. The operation of switch S2B and operated switch S3A complete a conducting path for the operation of relay AR which extends from ground through break contact 21 of the CALL button through make contact S2B, make contact S3A, break contact 5 of relay DTS, break contact 7 of relay RB, the winding of relay AR and thence to the potential source 632. The winding of relay AR is shunted by a diode X9 which serves to reduce contact arcing by limiting the transient voltage generated by the collapsing magnetic field as current is removed from the operating path when the relay is required to release. It will be noted that similar protection is afforded to other relays and solenoids shown in FIGS. 6 and 7.

The operation of relay AR initiates the RESET function. The RESET sequence of operations is substantially identical to that described above for RESET during the RECORD mode except that erasure is disabled. If the subscriber abandons the call before the number is completely pulsed out, the RESET function starts as the handset 111 is placed on its accommodating switchhook cradle 112 or as switchhook cradle 112 is depressed manually.

*Call mode for dual-dial-tone calls*

A dual-dial-tone type of number which is entered on the display card 107 is readily recognized by a subscriber by the access digit or digits which precede the usual directory number. Accordingly, the subscriber is alerted to the fact that a special sequence of operations is required for processing such a call and that the call involves a second dial tone and a double operation of the CALL button. After the subscriber selects a dual-dial-tone type of number with the selector knob 106 he lifts the handset 111 off hook. As soon as the local dial tone is heard, he depresses the CALL button 105 momentarily. The sequence of operations which obtains upon the momentary operation and release of the CALL button 105 has previously been described. In summary, drum 211 is caused to rotate after about one-half second and switches S5A and S5B operate. The operation of switches S5A and S5B results in the operation of solenoid L2 which in turn starts the rotation of cam 2. After about 0.7 second of rotation by drum 211, switch S2B operates. It should be noted that operation of switch S2B does not cause automatic reset as described above since switch S3A is still unoperated. Instead, switch S2B operated results in the operation of relay DTS over a path which extends from ground through break contact 21 of the CALL button, make contact of switch S2B, break contact of switch S3A, winding of relay DTS and thence to positive potential 713 through the break contacts of the CALL button and relay AR. The continuing rotation of cam 2 causes switch S2C to operate. The operation of switch S2C releases solenoid L2 and cam 2 flys back to the start position. At this point outpulsing of the access digit or digits commences. After about 1.3 seconds of drum rotation switches S3A and S3B operate.

As the last pulse of the access digit or digits ends, relay ON slowly releases. Relay ON released completes an operating path for solenoid L2 by way of break contact 12 of relay ON, solenoid L2 operates and cam 2 starts rotation. Again after about 0.7 second of rotation, cam 2 operates switch S2B. Although switch S3A is operated, operation of switch S2B does not cause reset because relay DTS has been operated. Instead, the operating path for drive clutch operating solenoid CL1 is opened at break contact 5 of relay DTS and break contact 6 of switch S2B, the drive clutch 622 is disengaged, and drum 211 and cam 2 both stop. At this point the dialer is in the fully stopped condition awaiting the second dial tone.

When the subscriber hears the second dial tone he again depresses the CALL button 105 momentarily. The operation of the CALL button 105 results in the release of relay DTS and solenoid L2 and in the enablement of automatic RESET. Specifically, solenoid L2 is released, cam 2 flys back to its start position and switch S2B closes. A path extending ground to solenoid CL1 is completed through break contact 6 of switch S2B, drive clutch 622 is engaged and drum 211 rotates. At this point the regular directory number is pulsed out in the manner previously described, and automatic RESET occurs as also described above for the CALL function of regular calls.

*Simultaneous call-record mode*

Normally numbers are recorded with handset 111 on-hook. In accordance with the invention, however, numbers can be recorded simultaneously with manual dialing for certain preselected tracks on the magnetic storage drum 211. Typically, such preselected numbers may include the last two numbers recorded on display card 107. The simultaneous CALL-RECORD mode is intended primarily for transient numbers, i.e., numbers which are to be stored for relatively short periods of time, such as a few hours or few days. As indicated schematically in FIG. 6, by the proximity of recording head 315 to the switches S6A and S6B and by the broken interconnecting line, switches S6A and S6B are operated by the head at its extreme position of travel, which corresponds to either of two selected tracks which are to be employed for the simultaneous CALL-RECORD mode. Accordingly, when the subscriber sets the indicator bar 108 to the proper position, switches S6A and S6B operate. These switches in effect condition the simultaneous CALL-RECORD mode of operation. The subscriber next depresses RECORD button 104 and RECORD lamp 626 lights over a path previously described. Also, as described above, under the section dealing with the RECORD mode of operation, the circuit is made ready to record the called number. The subscriber then lifts handset 111 and waits for the dial tone. Relay CA then operates over a path which extends from power source 718 through break contact 9 of relay AR, the windings of the CA relay, break contact 3 of switch S4B, make contact 2 of switch S6A, make contact 9 of relay RA, make contact 12 of the additional switchook contact SHA and thence to ground. The operation of relay CA completes the circuit preparation for the simultaneous CALL-RECORD function and the CALL lamp 627 lights.

As soon as the dial tone is heard in the receiver, the subscriber proceeds to dial the desired number. The standard dial pulse contacts DP, FIG. 4, pulse the telephone line RT and the anticipator dial pulse dial contacts ADP, FIG. 4, control the current through the RECORD-PRODUCE head 315 for recording the dial pulses on storage drum 211. The circuit operating sequences are the same as those described above under the heading, RECORD MODE. In the simultaneous RECORD-CALL function, however, RESET is obtained by operation of the RESET button 103 or by return of handset 111 to its cradle at the end of the call.

To preserve the continuity of the foregoing description, certain miscellaneous circuit components and interconnections shown in the drawings have not as yet been specifically referred to nor have their functions been discussed. Among these circuit components are included diodes X1 through X7 which are employed as current gates to minimize the number of relay and switch contacts. Certain of the control-button, switch and relay contact interconnections are employed in a fashion, generally well understood by persons skilled in the art, to avoid malfunction of the device from indiscriminate manipulation of the control button by the subscriber. for example, the CALL cycle does not commence until the CALL button is operated and released. Without such an arrangement, the subscriber could override the automatic stopping of the drum for the second dial tone waiting period. Consequently, the interconnection referred to ensures that after the subscriber operates the CALL button the second time for the dual-dial-tone type of number, the CALL button is disabled until the reset occurs. It will be noted that a somewhat similar arrangement has been provided for the DIAL TONE button.

It is to be understood that the embodiment described herein is merely illustrative of the principles of the invention. A wide variety of arrangements and modifications may be devised by persons skilled in the art without departing from the spirit and scope of the invention.

What is claimed is:

1. In combination, an integral assembly comprising a telephone set, dialing means, repertory multiple-channel storage means, first means including a first set of signal contacts responsive to said dialing means for generating signals to be recorded by said repertory means, second means including a second set of signal contacts responsive to said dialing means for generating signals to be applied directly to a telephone line, means for selecting any one of three operational modes, each of said modes being defined, respectively, by the operation of said first means, by the operation of said second means and by the combined operation of said first and second means, said storage means comprising a magnetic drum, a combination reproduce-record-erase head mounted for lateral movement along said drum thereby to align a selective one of said channels, means including a motor for rotating said drum thereby to expose successive portions of a selective one of said channels to said head, and means including said first set of contacts responsive to the release of said dial from a preselected OFF-NORMAL position representative of a dialed digit for initiating the operation of said rotating means, thereby ensuring positive control over the elapsed time between the inception of rotation of said drum and the inception of recording on said drum.

2. In combination, an integral assembly comprising a telephone set, dialing means, repertory multiple-channel storage means, first means including a first set of signal contacts responsive to said dialing means for generating signals to be recorded by said repertory means, second means including a second set of signal contacts responsive to said dialing means for generating signals to be applied directly to a telephone line, means for selecting any one of three operational modes, each of said modes being defined, respectively, by the operation of said first means, by the operation of said second means and by the combined operation of said first and second means, said storage means comprising a magnetic drum, a combination reproduce-record-erase head mounted for lateral movement along said drum thereby to align a selective one of said channels, means including a motor for rotating said drum thereby to expose successive portions of a selective one of said channels to said head, and means including said first set of contacts responsive to the release of said dial from a preselected OFF-NORMAL position representative of a dialed digit for initiating the operation of said rotating means, thereby ensuring positive control over the elapsed time between the inception of rotation of said drum and the inception of recording on said drum, said assembly including first and second manually operated control means, means responsive to the operation of said first control means followed by the dialing of at least one access digit and followed in turn by a second operation of said first control means and by the manual dialing of a directory number for recording a dual-dial-tone type of call on said storage means, means responsive to the operation of said second control means for automatically applying to said line the access digits of a recorded one of said dual-dial-tone calls, means automatically operative after the automatic application of said last named access digits to said line for terminating the rotation of said drum for an indefinite period in anticipation of the receipt of a second dial tone, and means responsive to a second operation of said second control means after the receipt of said second dial tone, for completing the application of said last named call to said line.

3. In combination in an integral assembly of apparatus including a telephone set, a dial and repertory multichannel storage means, first means including a first set of pulse generating contacts responsive to the operation of said dial for the generation of pulses and for the direct application of said pulses to a telephone line, second means including a second set of pulse generating contacts responsive to the release of said dial from an OFF-NORMAL position for the generation of an anticipator pulse followed by the generation of pulses corresponding to the digit dialed and for the application of said last named pulses to said storage means, means precluding the application of said anticipator pulse to said storage means, means responsive to said anticipator pulse for initiating the exposure of successive unrecorded portions of said storage means in anticipation of the application of pulses to be recorded, means including said first set of contacts for operating said set, including outpulsing to said line, independently from said storage means, and means including said first contacts and said second contacts for simultaneously recording pulses in said storage means and for applying pulses to said line.

4. In combination in an integral assembly, apparatus including a telephone set, a dial and repertory multichannel storage means, first means including a first set of pulse generating contacts responsive to the release of said dial from an OFF-NORMAL position corresponding to a dialed digit for generating pulses indicative of said digit and for applying said pulses directly to a telephone line, second means including a second set of pulse generating contacts responsive to the release of said dial from an OFF-NORMAL position corresponding to a dialed digit for generating an anticipator pulse followed after a preselected time interval by the generation of pulses indicative of said last named digit and for applying said last named pulses to said storage means thereby to record said last named pulses, third means responsive to said anticipator pulse for imparting mechanical movement to said storage means at a preselected rate suitably related to the rate of generation of dial pulses by said second means, the interval of time elapsing between the application of one of said anticipator pulses to said third means and the attainment of said preselected rate by said storage means being not greater than said preselected time interval, and means for operating said apparatus selectively employing said first means, or said second and third means or said first, second and third means.

5. Apparatus in accordance with claim 4 wherein said storage means comprises a magnetic drum normally maintained at a particular rest position of rotation, means manually operative for restoring said drum to said rest position after the employment of said second and third means to store a directory number thereon, means for automatically applying to said telephone line the pulses corresponding to a directory number stored on said drum, and means automatically operative after the functioning of said last named means for restoring said drum to said particular rest position.

6. In combination in an integral assembly of apparatus including a telephone set, a dial and multichannel magnetic drum storage means, means including a first set of dial pulse contacts for applying pulses directly to a telephone line, means including a second set of dial pulse contacts for generating an anticipator pulse followed by the generation of pulses indicative of a dialed digit and for applying said last named pulses to said drum for storage, means for recording and automatically calling a dual-dial-tone type of call including means for automatically introducing an unrecorded gap of a predetermined length on said drum at a point between the recorded access digits and the recorded directory number of said dual-dial-tone call, means operative during the CALL mode of operation for automatically stopping the rotation of said drum for an indefinite period of time when said unrecorded gap is reached during the rotation of said drum, whereby a subscriber may wait any required period for the receipt of a second dial tone during the CALL mode of operation of said apparatus and restart the rotation of said drum and the automatic transmission of the directory number of said dual-dial-tone call, and means automatically operative upon the termination of the automatic dialing out of the final digit of a recorded dual-dial-tone type of call for returning said drum to a preselected index position.

7. In a magnetic-drum-type repertory dialer telephone, apparatus comprising, in combination, as an integral unit, a telephone dial, first means for successively opening and closing a circuit path responsive to the run-down of said dial from an OFF-NORMAL position corresponding to a dialed digit, a magnetic drum, means for rotating said drum responsive to the first operation of said first means which occurs after the inception of said run-down, a combination record-erase-reproduce head, and means responsive to said first operation of said first means for enabling the erasure from said drum of previously recorded pulse and the simultaneous application to said drum of pulses generated by said first means.

8. Apparatus in accordance with claim 7 including second means for successively opening and closing a circuit path responsive to the run-down of said dial thereby to generate pulses indicative of a dialed digit, and means for applying said last named pulses directly to a telephone line.

9. Apparatus in accordance with claim 8 including means for operating said apparatus selectively in any one of three modes, said modes comprising, respectively, the utilization of said first means, or the utilization of said second means or the combined utilization of said first and second means.

10. In a magnetic drum type repertory dialer telephone, apparatus comprising, in combination as an integral unit, a telephone dial, a first set of contacts operatively responsive to the run-down of said dial from an OFF-NORMAL position corresponding to a dialed digit, a magnetic drum, a combination record-erase-reproduce head, a first relay normally shunted by said first set of contacts, said relay being operatively responsive to the first operation of said first contacts occurring during a period of run-down of said dial, first circuit means for applying pulses of current generated by the successive operation of said first contacts to said head, second circuit means normally shunting said first circuit means thereby rendering said first circuit means inoperative, third circuit means responsive to the operation of said first relay for rotating said drum, fourth circuit means enabled after the first operation of said first set of contacts and responsive thereafter to the operation of said first relay for opening said second circuit means, thereby enabling said first circuit means, whereby the pulses of current generated by successive operation of said first contacts after the first operation thereof are applied to said head by said first circuit means.

11. Apparatus in accordance with claim 10 including a second set of contacts operatively responsive to the rundown of said dial thereby to generate pulses indicative of a dialed digit, and means for applying said last named pulses directly to a telephone line.

12. Apparatus in accordance with claim 11 including means for selectively operating said apparatus in any one of three modes, said modes comprising, respectively, the utilization of said first contacts, or the utilization of said second contacts or the combined utilization of said first and second contacts.

References Cited by the Examiner

UNITED STATES PATENTS

| | | | |
|---|---|---|---|
| 2,095,298 | 10/1937 | Tauschek | 179—7.1 |
| 2,941,043 | 6/1960 | Ham et al. | 179—90 |
| 3,040,133 | 6/1962 | Kobler et al. | 179—90 |

ROBERT H. ROSE, *Primary Examiner.*

H. W. GARNER, R. LINN, *Assistant Examiners.*